U.S. Patent Number: 4,915,710
Date of Patent: Apr. 10, 1990

Miyazaki et al.

[54] ABRASIVE COMPOSITION AND PROCESS FOR POLISHING

[75] Inventors: Kunihiro Miyazaki; Ken Ishitobi, both of Shiojiri; Yoshinobu Yamaguchi, Nagoya, all of Japan

[73] Assignees: Showa Denko Kabushiki Kaisha, Tokyo; Yamaguchi Seiken Kogyo Kabushiki Kaisha, Aichi, both of Japan

[21] Appl. No.: 324,057

[22] Filed: Mar. 16, 1989

[30] Foreign Application Priority Data

Sep. 20, 1988 [JP] Japan .................................. 63-235545

[51] Int. Cl.[4] .............................................. B24D 3/02
[52] U.S. Cl. ........................................ 51/309; 51/293; 106/3
[58] Field of Search ........................ 51/293, 309; 106/3

[56] References Cited

U.S. PATENT DOCUMENTS

| | | | |
|---|---|---|---|
| 4,226,623 | 10/1980 | Koshiyama et al. | 106/3 |
| 4,389,819 | 6/1983 | Williamson et al. | 51/309 |
| 4,645,561 | 2/1987 | Rea | 51/309 |
| 4,685,937 | 8/1987 | Hori et al. | 51/293 |
| 4,696,697 | 9/1987 | Kitano et al. | 51/309 |
| 4,705,566 | 11/1987 | Senda et al. | 106/3 |
| 4,769,046 | 9/1988 | Senda et al. | 51/293 |
| 4,769,073 | 9/1988 | Tasfu et al. | 51/309 |
| 4,853,000 | 8/1989 | Potter | 51/309 |

*Primary Examiner*—Paul Lieberman
*Assistant Examiner*—Willie J. Thompson
*Attorney, Agent, or Firm*—Sughrue, Mion, Zinn, Macpeak & Seas

[57] ABSTRACT

An abrasive composition particularly suitable for polishing an aluminum-based substrate for a magnetic recording disc, the composition comprising: an alumineous abrasive, preferably in an amount of 3 to 25% by weight; a polishing accelerator of gluconic and/or lactic acid, preferably in an amount of 0.1 to 3% by weight; optionally with sodium gluconate and/or sodium lactate in an amount of 0.1 to 3% by weight; colloidal alumina, preferably in an amount of 0.1 to 5% by weight; and water, the composition typically having a pH of 3 to 5.

17 Claims, No Drawings

ABRASIVE COMPOSITION AND PROCESS FOR POLISHING

BACKGROUND OF THE INVENTION

1. Field of the Invention

The present invention relates to an abrasive composition. More particularly, the present invention relates to an abrasive composition for rapidly polishing and providing a mirror finish to an aluminum-based substrate for a magnetic recording disc, and a process therefor. This abrasive composition has a high polishing efficiency, is not harmful to the human body such as an operator's hands, etc., and has little corrosive affect on machinery such as a polishing machine and peripheral equipments, and waste therefrom is easily treated.

2. Description of the Related Art

A magnetic recording disc comprises an aluminum-based substrate including an aluminum or aluminum alloy (referred to only as aluminum hereafter) disc, a nickel substrate formed by plating nickel-phosphine onto an aluminum disc, and an anodized aluminum substrate formed by anodizing an aluminum disc. A magnetic film is applied to the aluminum-based substrate by coating, plating or sputtering, and the surface of the aluminum-based substrate is provided with a mirror-finish by polishing.

A known abrasive composition used for polishing an aluminum substrate for a magnetic recording disc, particularly a nickel substrate or an anodized substrate as mentioned above, is a weak acid slurry which comprises water, an alumineous abrasive and a polishing accelerator of nickel sulfate, the composition having a pH of 4 to 6 (Japanese Unexamined Patent Publication (Kokai) No. 61-278587, published on Sept. 12, 1986). The inventors has proposed a similar weak acid abrasive composition in which the polishing accelerator of nickel sulfate is replaced by nickel sulfanate (Japanese Patent Application No. 62-25359, filed on Oct. 9, 1987). Also known is a strong acid slurry which comprises water, an alumineous abrasive and a polishing accelerator of aluminum nitrate, the composition having a pH of 3 to 4 (Japanese Unexamined Patent Publication (Kokai) No. 62-25187, published on Feb. 3, 1988).

A strong acid abrasive composition, in comparison with a weak acid abrasive composition, has a higher polishing efficiency and provides a superior surface finish, but brings problems in that it is corrosive to a polishing machine or peripheral equipment, resulting in wastage or damage thereof and contamination by rust during the polishing operation, and that it may splash onto the skin or clothes of operators and is harmful to the human body, for example, roughens the bands. These effects are caused by nitrate radical (ion) contained in aluminum nitrate, which is highly corrosive to machining and roughens the skin of the human body by breaking bridges of a three dimensional structure of proteins, and which requires a cumbersome treating of dissolved nitrogen in waste water.

To avoid these problems, weak acid abrasive compositions are used, but these are disadvantageous due to a relatively low polishing efficiency and a relatively low grade surface finish.

Therefore, there is a strong demand for an abrasive composition having a polishing efficiency equal to or higher than that obtainable by a strong acid abrasive composition, does not cause a corrosion of machinery and roughening of the skin, and is easily treated as a waste.

The object of the invention is to provide such an abrasive composition.

SUMMARY OF THE INVENTION

The above and other objects, features and advantages are obtained by an acid abrasive composition, particularly for polishing an aluminum-based magnetic-recording-disc substrate, comprising an alumineous abrasive, a polishing accelerator of gluconic and/or lactic acids, a surface modifier of colloidal alumina, and water.

The present invention further provides a process for polishing a workpiece, particularly an aluminum-based magnetic-recording-disc substrate, with an abrasive composition as provided above.

The inventors considered that sour or acid food additives, which are not harmful or corrosive and do not contain nitrogen, would be suitable to solve all of the above problems of damage from chemicals such as roughening of the skin, corrosion of machinery, and treatment of waste, and carried out performance tests of abrasive compositions containing citric acid, gluconic acid, succinic acid, lactic acid, tartaric acid, fumaric acid or malic acid. Note, acetic acid which has an unpleasant odor and is relatively corrosive, was excluded. Namely, an aluminum-based magnetic-disc substrate was polished with abrasive compositions composed of water, an alumineous abrasive and the above various organic acids, and it was found that each abrasive composition had a polishing activity equal to or greater than that of an abrasive composition containing aluminum nitrate. It was also found that, although this series of organic acids provide polishing rates comparative to aluminum nitrate, they generate remarkable protrusions in comparison with aluminum nitrate and sometimes generate pits which are not generated by aluminum nitrate, and therefore, the abrasive compositions using the above organic acids alone are not sufficient for practical use due to a low grade surface finish. Accordingly, the inventors investigated a prevention of surface defects such as protrusions and pits while preserving a high polishing activity of the above organic acids, and found that an addition of colloidal alumina (alumina sol) with gluconic acid or lactic acid is remarkably effective for improving the grade of the surface finish.

It is considered that the protrusions or pits are generated by remaining or etching defects in a plating layer of, for example, nickel sulphur, of the aluminum-based substrate, and the protrusions and pits result from an inappropriate balance between a chemical action of a polishing accelerator and a mechanical action of an alumineous abrasive. Therefore, an additive that can appropriately control the chemical action of a polishing accelerator or the mechanical action of an alumineous abrasive must effectively prevent these protrusions and pits. The inventors found, and disclosed in Japanese Patent Application No. 63-86490, that an addition of magnesium nitrate and crystalline cellulose is effective in an abrasion composition containing nickel sulfate or sulfanate as a polishing accelerator. But it was found that an addition of the above chemicals is not effective in an abrasive composition containing a polishing accelerator of the organic acids described above, namely, a control of only the chemical action of the polishing accelerator is not successful in these cases. From this result, the inventors considered that it would be effective to enhance or assist the mechanical action of an alumineous abrasive, by which the chemical action of a polishing accelerator is balanced, and thus added colloidal alumina to an abrasive composition. The colloidal alumina effectively increases the activity of composition and improves the holding of an alumineous abrasive on a pad, and as a result, protrusions and pits were prevented in the cases of gluconic acid and lactic acid. But, in the case of the other acids, i.e., citric acid, succinic acid, tartaric acid, fumaric acid and malic acid, an addition of colloidal alumina does not prevent protrusions or pits. It is considered that the latter acids are a hydroxyl di- or tri-carboxylic acid having two or more carboxyl groups, in contrast to hydroxylmonocarbonic acid having one carboxyl group in the case of gluconic or lactic acid, and an acid having two or more carboxyl groups does not make it beohmite or pseudobeohmite into colloidal or causes colloidal beohmite or pseudobeohmite, even if made, to be gelled due to an instability thereof, and does not act as a colloidal alumina.

Accordingly, the present invention concerns an abrasive composition, particularly for polishing an alumina-based substrate, the composition being an aqueous slurry of an alumineous abrasive and a polishing accelerator of gluconic and/or lactic acids, added with colloidal alumina. This abrasive composition allows a high polishing efficiency, a fine surface finish without pits and havng less protrusions, and a prevention of damage such as roughening of the skin by chemicals, or a corrosion of machinery.

Although the above composition is practically useful, an addition of sodium gluconate and/or sodium lactate effectively increases the polishing efficiency without losing the fine grade surface finish.

DESCRIPTION OF THE PREFERRED EMBODIMENTS

The invention is now described in detail.

In the present invention, the gluconic acid, lactic acid, sodium gluconate and sodium lactate has a chemical action or a chemical polishing effect on a workpiece, particularly an aluminum-based magnetic-recording-disc substrate. The colloidal alumina increases the viscosity of the composition and holds the alumineous abrasive in the composition, and prevents sedimentation of the alumineous abrasive by dispersion in the composition. The colloidal alumina further holds the abrasive on a pad, which accelerates mechanical polishing effect and provides a uniform action of the abrasive over the entire surface to be polished. As an extension of these functions, the colloidal alumina prevents a generation of surface defects such as protrusions and pits on the polished surface of the workpiece.

The content of gluconic acid ($C_6H_{12}O_7$, sold as an 50% aqueous solution) and/or lactic acid ($C_3H_6O_3$, sold as a 90, 50 or 40% aqueous solution) is preferably from 0.1% to 3% by weight, based on the total weight of the composition. A content of less than 0.1% by weight of the acid will not increase the polishing efficiency and reduce scratches and more than 3% by weight of the acid does not increase the polishing efficiency and may result in remarkable protrusions. The most preferred range is 0.5% to 2% by weight for a high polishing efficiency and a fine grade surface finish.

The colloidal alumina is alumina hydrate ($Al_2O_3 \cdot nH_2O$, n=1 to 2) having a beohmite or pseudobeohmite structure in the form of a fine powder of a submicron size and is dispersable in the form of colloid at an acid range provided that, dependency on the kind of the acid, it is not formed into a colloid or is not gelled due to a low stability of the colloid form. The content of the colloidal alumina, including crystal water, is preferably from 0.1% to 5% by weight of the composition. Less than 0.1% by weight of the colloidal alumina does not provide a sufficient effect, and more than 5% by weight of the colloidal alumina makes the viscosity of the composition too high, making a uniform distribution of the alumineous abrasive in the composition and stable supply of the composition to a polishing machine difficult, and further, causes an agglomeration of the alumineous abrasive. The most preferable range is 0.2% to 1% by weight, from the viewpoint of the effects and workability.

The sodium gluconate ($C_6H_{11}O_7Na$) and/or sodium lactic ($C_3H_5O_3Na$), sold as a 50% aqueous solution) have a polishing acceleration effect in themselves, but have a further remarkable effect when combined with gluconic and/or lactic acids. Less than 0.1% by weight does not provide such an effect and more than 3% by weight results in a reduction of the effect. Therefore, 0.5 to 2% by weight is most preferable for a high polishing efficiency and a fine grade surface finish.

The content of the alumineous abrasive is preferable from 3% to 25% by weight, more preferably 15% to 20%, by weight of the composition. Less than 3% by weight of the alumineous abrasive lowers the polishing efficiency and degrades the surface finish, and more than 25% by weight of the abrasive does not provide a significant improvement of the polishing efficiency and increases the viscosity of the composition, thereby lowering the workability. The particle size of the alumineous abrasive is preferably not more than 25 $\mu$m at maximum and not more than 15 $\mu$m on average, since the abrasive having a higher praticle size causes a roughened surface and scratches. The particle size distribution of the abrasive in use should be selected to meet with a required surface roughness.

Preferably, the abrasive composition has a pH of from 3 to 5, i.e., a weak acid state. If necessary, sulfuric or sulfamic acid, etc., may be added to the composition to obtain a desired pH, or for other purposes.

The abrasive composition according to the present invention can be thickly concentrated, as this is advantageous for storage and transportation, and even necessary for specific usages. For example, a thick composition containing 15-25 wt% of alumineous abrasive is preferable for production or storage. Such a thick composition can be used for polishing either without dilution or when diluted with about 2 to 6 times the equivalent amount of water.

The abrasive composition may be prepared, for example, by adding and mixing gluconic acid and/or acetic acid optionally with sodium gluconic acid and/or sodium lactate to an aqueous slurry of an aluminous abrasive.

The abrasive composition of the present invention is particularly suitable for polishing an aluminum-based substrate for a magnetic recording disc. Such an aluminum-based substrate includes, for example, (1) an aluminum or aluminum-alloy substrate (referred to only as "aluminum substrate" hereafter), (2) an aluminum substrate plated with nickel-phosphine or nickel-boron, e.g., by electroless plating, (3) an anodized aluminum substrate, and (4) an aluminum substrate treated with a chromate. A magnetic layer is applied to these aluminum-based substrates by coating, plating, or sputtering, etc.

Other materials which can be polished with the abrasive composition of the present invention include metals other than aluminum, synthetic resins.

The substrate may be polished with the abrasive composition by a conventional technique.

The abrasive composition according to the present invention provides a workpiece with a finer finished surface having far fewer scratches and an insignificant surface roughness, at a higher efficiency. The abrasion composition has a further advantage in that it is less corrosive to machinery and less harmful to the human body and is easily treated as a waste.

The invention is further described by way of examples. In the Examples, the polishing characteristics of the abrasive compositions were determined by the following polishing test.

Namely, the polishing was conducted by using a four-way both-side polishing machine having surface plates 640 mm in diameter. Suede-type pads (Chiyoda K.K. D'tex 25-3) were attached to the surface plates, and ten (10) aluminum-based discs having 20 μm thick nickel-phosphine plated layers on both sides thereof and having a diameter of 3.5 inches were mounted on the polishing machine and polished for 6 minutes. The polishing conditions were a rotation speed of the lower surface plate of 70 rpm, a working pressure of 100 g/cm$^2$, and a slurry supply of 100 ml/min. After polishing, the aluminum-based disc was weighed and the polishing rate was determined from the loss in weight of the disc. The surface of the disc was observed by a differential interference microscope and a 100,000 lux spot light and the degrees, of protrusions, pits, scratching, etc., were determined. The surface roughness was measured by a Talystep and Talydata 2000 model manufactured by Rank Taylor Hobson Company.

EXAMPLES 1 TO 5

Five abrasion compositions according to the present invention were prepared by dissolving 0.3%, 0.5%, 1%, 2%, and 5% by weight of gluconic acid to a 22 wt% aqueous slurry of alumina powders ($\alpha$-Al$_2$O$_3$) having a maximum particle size of 6.4 μm and an average particle size of 2.0 μm, followed by adding colloidal alumina in an amount of 1% by weight as a dry solid, and stirring the slurry. The first four abrasive compositions (Examples 1 to 4) were diluted 3 times by volume with pure water, and the final abrasive composition (Example 5) was not diluted, before the polishing tests thereof as described above were conducted.

The results are shown in Table 1.

EXAMPLES 6 TO 10

The procedures of Examples 1 to 5 repeated but the gluconic acid was replaced with 0.3%, 0.5%, 1%, 2%, and 3% by weight of lactic acid to prepare abrasive compositions according to the present invention. The polishing tests for these abrasive compositions were conducted, and the results are shown in Table 1.

EXAMPLES 11 TO 12

To slurries containing gluconic acid or lactic acid in an amount of 1% by weight, as prepared in Examples 3 and 8, colloidal alumina was added in an amount of 0.1% by weight to prepare abrasive compositions according to the present invention. The polishing tests were conducted for these compositions, and the results are shown in Table 1.

EXAMPLES 13 TO 14

To slurries containing gluconic acid or lactic acid in an amount of 1% by weight, as prepared in the Examples, sodium gluconic acid or sodium lactate, respectively, was added in an amount of 1% by weight, followed by adding colloidal alumina in an amount of 1% by weight, to prepare abrasive compositions according to the present invention. The polishing tests were conducted for these compositions, and the results are shown in Table 1.

EXAMPLES 15 TO 16 (COMPARATIVE)

No colloidal alumina was added to slurries containing 1% by weight of gluconic acid or lactic acid, as prepared in Examples 3 and 5, and abrasive compositions for comparative purposes were prepared. The polishing tests were conducted for these compositions, and the results are shown in Table 1.

EXAMPLES 17 TO 19

To a slurry containing an alumineous abrasive as used in Example 1 in an amount of 22% by weight, 1%, 2% and 4% by weight of aluminum nitrate were added and dissolved to prepare abrasive compositions for comparison purposes. The polishing tests were conducted for these compositions, and the results are shown in Table 1.

TABLE 1

| | | Main polishing accelerator (wt %) | Auxiliary polishing accelerator (wt %) | Colloidal alumina (wt %) | Polishing rate (μm/min.) | Surface roughness Rtm (Å) | Surface defects** Protrusion | Pits |
|---|---|---|---|---|---|---|---|---|
| Example | 1 | Gluconic acid 0.3 | — | 1 | 1.50 | 249 | 0 | 0 |
| | 2 | Gluconic acid 0.5 | — | 1 | 1.55 | 236 | 0 | 0 |
| | 3 | Gluconic acid 1 | — | 1 | 1.60 | 243 | 0 | 0 |
| | 4 | Gluconic acid 2 | — | 1 | 1.60 | 240 | 0 | 0 |
| | 5 | Gluconic acid 3 | — | 1 | 1.58 | 258 | 5 | 1 |
| | 6 | Lactic acid 0.3 | — | 1 | 1.51 | 251 | 0 | 0 |
| | 7 | Lactic acid 0.5 | — | 1 | 1.56 | 239 | 0 | 0 |
| | 8 | Lactic acid 1 | — | 1 | 1.62 | 227 | 0 | 0 |
| | 9 | Lactic acid 2 | — | 1 | 1.62 | 230 | 0 | 0 |
| | 10 | Lactic acid 3 | — | 1 | 1.59 | 251 | 6 | 1 |
| | 11 | Gluconic acid 1 | — | 0.1 | 1.52 | 264 | 13 | 0 |
| | 12 | Lactic acid 1 | — | 0.1 | 1.53 | 262 | 15 | 0 |
| | 13 | Gluconic acid 1 | Sodium gluconate 1 | 1 | 1.74 | 240 | 0 | 0 |
| | 14 | Lactic acid 1 | Sodium lactate 1 | 1 | 1.79 | 239 | 0 | 0 |
| | 15* | Gluconic acid 1 | — | — | 1.53 | 259 | 100< | 3 |
| | 16* | Lactic acid 1 | — | — | 1.54 | 261 | 100< | 3 |
| | 17* | Aluminum nitrate 1 | — | — | 1.48 | 265 | 10 | 0 |
| | 18* | Aluminum nitrate 2 | — | — | 1.51 | 260 | 15 | 0 |

TABLE 1-continued

| | Main polishing accelerator (wt %) | Auxiliary polishing accelerator (wt %) | Colloidal alumina (wt %) | Polishing rate (μm/min.) | Surface roughness Rtm (Å) | Surface defects** Protrusion | Pits |
|---|---|---|---|---|---|---|---|
| 19* | Aluminum nitrate 4 | — | — | 1.53 | 262 | 15 | 0 |

*Examples 15 to 19 were comparative.
**The protrusions were counted for the front and rear sides of 10 discs (1 batch) by a differential interference microscope at a magnitude of 200.
***The pits were counted for the front and rear sides of 10 discs (1 batch) by the naked eye. The pits were far larger than the protrusions, so that observation was possible by the naked eye.

Table 1 demonstrates that abrasive compositions using gluconic or lactic acid with colloidal alumina according to the present invention provide polishing rates equivalent to or higher than, and surface roughnesses equivalent to or less than, those obtained by conventional abrasive compositions using aluminum nitrate. Also, less surface defects such as protrusions and pits are formed.

The polishing rate was decreased almost in proportion to the concentration of the gluconic or lactic acid, and at 0.3% by weight (0.1% by weight after dilution) of the gluconic or lactic acid, the polishing rate was decreased to one equivalent to that obtainable by a conventional abrasive composition. Therefore, not less than 0.1% by weight of the gluconic or lactic acid is effective and useful. At more than 3% by weight, the polishing rate tended to decrease and the formation of the protrusions and pits (pits are not formed by a conventional abrasive composition) began. Therefore, not more than 3% by weight is preferable.

The effects of an addition of the colloidal alumina are clear since, when the colloidal alumina was not added as in Examples 15 to 16, protrusions were remarkably formed and pits were also formed. The concentration of the colloidal alumina is preferably not less than 0.1% by weight, since at 0.1% by weight, the polishing rate was decreased in comparison with that obtainable at 1% by weight, and the formation of protrusions began. When the concentration of the colloidal alumina is increased to more than 5% by weight, the practical workability is lost due to an increased viscosity, as described before and therefore, not more than 5% by weight is preferable. The results from 5% by weight of the colloidal alumina were similar to those obtained at 1% by weight.

The addition of sodium gluconate or sodium lactic increased the polishing rate, when the amount of the sodium gluconate or sodium lactic was from 0.1 to 3% by weight, and a 5% to 10% increase of the polishing rate was obtained.

Thus, the abrasive composition according to the present invention has the following advantages, when compared with an abrasive composition using aluminum nitrate as a polishing acceleration:
(i) Increased polishing rate;
(ii) Smaller surface roughness;
(iii) Less surface defects such as protrusions and pits;
(iv) Uniform high grade surface;
(v) Less corrosive to machinery;
(vi) Less harmful to the human body;
(vii) Easy treatment of the waste.

We claim:

1. An acid abrasive composition comprising an aqueous slurry of alpha alumina, a polishing accelerator of gluconic and/or lactic acids, a surface modifier of colloidal alumina, and water.

2. A composition according to claim 1, further comprising another polishing accelerator of sodium gluconate and/or sodium lactate.

3. A composition according to claim 1, wherein the gluconic and/or lactic acids are contained in an amount of 0.1 to 3% by weight based on the total weight of the composition and the composition has a pH of 3 to 5.

4. A composition according to claim 1, wherein the colloidal alumina is contained in an amount of 0.1 to 5% by weight based on the total weight of the composition.

5. A composition according to claim 1, wherein the sodium gluconate and/or sodium lactate are contained in an amount of 0.1 to 3% by weight based on the total weight of the composition.

6. A composition according to claim 1, wherein the alpha alumina has a maximum particle size of not more than 25 μm and an average particle size of 0.5 to 15 μm, and is contained in an amount of 3 to 25% by weight based on the total weight of the composition.

7. An acid abrasive composition, for polishing an aluminum-based magnetic-recording-disc substrate, comprising an aqueous slurry of:
3 to 25% by weight of alpha alumina having a maximum particle size of not more than 25 μm and an average particle size of 0.5 to 15 μm;
0.1 to 3% by weight of a polishing accelerator of gluconic and/or lactic acids;
0.1 to 5% by weight of colloidal alumina; and
water, wherein the composition has a pH of 3 to 5.

8. A composition according to claim 7, further comprising another polishing accelerator of sodium gluconate and/or sodium lactate.

9. A process for polishing a workpiece with an acid abrasive composition comprising contacting a substrate with an aqueous slurry comprised of alpha alumina, a polishing accelerator of gluconic and/or lactic acids, a surface modifier of colloidal alumina, and water.

10. A process according to claim 9, wherein the workpiece is a substrate for a magnetic recording disc, made of one of aluminum and an aluminum alloy.

11. A process according to claim 10, wherein the substrate is plated with nickel-phosphine.

12. A process according to claim 10, wherein the substrate is anodized.

13. A process according to claim 9, further comprising another polishing accelerator of sodium gluconate and/or sodium lactate.

14. A process according to claim 9, wherein the abrasive composition contains the gluconic and/or lactic acids in an amount of 0.1 to 3% by weight based on the total weight of the composition and the abrasive composition has a pH of 3 to 5.

15. A process according to claim 9, wherein the abrasive composition contains the colloidal alumina in an amount of 0.1 to 5% by weight based on the total weight of the composition.

16. A process according to claim 9, wherein the abrasive composition contains the sodium gluconate and/or sodium lactate in an amount of 0.1 to 3% by weight based on the total weight of the composition.

17. A process according to claim 9, wherein the abrasive composition contains the alpha alumina in an amount of 3 to 25% by weight based on the total weight of the composition, the alpha alumina having a maximum particle size of not more than 25 μm and an average particle size of 0.5 to 15 μm.

* * * * *